(12) United States Patent  (10) Patent No.: US 8,514,400 B2
Mohageg et al.  (45) Date of Patent: Aug. 20, 2013

(54) OPTICAL GYROSCOPE SENSORS BASED ON OPTICAL WHISPERING GALLERY MODE RESONATORS

(75) Inventors: Makan Mohageg, Granada Hills, CA (US); Lute Maleki, Pasadena, CA (US); David Seidel, Alta Loma, CA (US); Vladimir S. Ilchenko, Arcadia, CA (US); Andrey B. Matsko, Pasadena, CA (US); Anatoliy A. Savchenkov, Glendale, CA (US); Wei Liang, Monrovia, CA (US)

(73) Assignee: OEwaves, Inc., Pasadena, CA (US)

( * ) Notice: Subject to any disclaimer, the term of this patent is extended or adjusted under 35 U.S.C. 154(b) by 334 days.

(21) Appl. No.: 13/065,587

(22) Filed: Mar. 23, 2011

(65) Prior Publication Data

US 2011/0255094 A1 Oct. 20, 2011

Related U.S. Application Data

(60) Provisional application No. 61/316,621, filed on Mar. 23, 2010, provisional application No. 61/357,211, filed on Jun. 22, 2010, provisional application No. 61/359,490, filed on Jun. 29, 2010.

(51) Int. Cl.
*G01C 19/64* (2006.01)

(52) U.S. Cl.
USPC .......................................................... 356/459

(58) Field of Classification Search
USPC ........................................ 356/459–461, 483
See application file for complete search history.

(56) References Cited

U.S. PATENT DOCUMENTS

| | | | |
|---|---|---|---|
| 5,929,430 A | 7/1999 | Yao et al. | |
| 6,389,197 B1 | 5/2002 | Iltchenko et al. | |
| 6,473,218 B1 | 10/2002 | Maleki et al. | |
| 6,488,861 B2 | 12/2002 | Iltchenko et al. | |
| 6,490,039 B2 | 12/2002 | Maleki et al. | |
| 6,567,436 B1 | 5/2003 | Yao et al. | |
| 6,762,869 B2 | 7/2004 | Maleki et al. | |
| 6,871,025 B2 | 3/2005 | Maleki et al. | |
| 6,873,631 B2 | 3/2005 | Yao et al. | |
| 6,928,091 B1 | 8/2005 | Maleki et al. | |
| 6,987,914 B2 | 1/2006 | Savchenkov et al. | |
| 7,024,069 B2 | 4/2006 | Savchenkov et al. | |
| 7,061,335 B2 | 6/2006 | Maleki et al. | |
| 7,092,591 B2 | 8/2006 | Savchenkov et al. | |

(Continued)

FOREIGN PATENT DOCUMENTS

WO 9002921 A1 3/1990
WO 9705712 A1 2/1997

(Continued)

OTHER PUBLICATIONS

Braginsky, V.B., et al., "Quality-Factor and Nonlinear Properties of Optical Whispering-Gallery Modes," Physics Letters A, 137(7, 8):393-397, May 1989.

(Continued)

*Primary Examiner* — Tarifur Chowdhury
*Assistant Examiner* — Jonathan Hansen
(74) *Attorney, Agent, or Firm* — Perkins Coie LLP

(57) ABSTRACT

Optical gyroscope devices based on optical whispering gallery mode resonators that measure rotations based on rotation-induced optical phase shift in optical whispering gallery mode resonators.

11 Claims, 14 Drawing Sheets

(56) References Cited

U.S. PATENT DOCUMENTS

| | | |
|---|---|---|
| 7,173,749 B2 | 2/2007 | Maleki et al. |
| 7,184,451 B2 | 2/2007 | Ilchenko et al. |
| 7,187,870 B2 | 3/2007 | Ilchenko et al. |
| 7,283,707 B1 | 10/2007 | Maleki et al. |
| 7,389,053 B1 | 6/2008 | Ilchenko et al. |
| 7,440,651 B1 | 10/2008 | Savchenkov et al. |
| 7,460,746 B2 | 12/2008 | Maleki et al. |
| 7,587,144 B2 | 9/2009 | Ilchenko et al. |
| 7,630,417 B1 | 12/2009 | Maleki et al. |
| 7,634,201 B2 | 12/2009 | Maleki et al. |
| 7,801,189 B2 | 9/2010 | Maleki et al. |
| 7,813,651 B2 | 10/2010 | Ilchenko et al. |
| 7,869,472 B2 | 1/2011 | Maleki et al. |
| 7,929,589 B1 | 4/2011 | Ilchenko et al. |
| 7,965,745 B2 | 6/2011 | Maleki et al. |
| 7,991,025 B2 | 8/2011 | Maleki et al. |
| 8,089,684 B1 | 1/2012 | Koonath et al. |
| 2002/0018611 A1 | 2/2002 | Maleki et al. |
| 2002/0018617 A1 | 2/2002 | Iltchenko et al. |
| 2002/0021765 A1 | 2/2002 | Maleki et al. |
| 2002/0097401 A1 | 7/2002 | Maleki et al. |
| 2003/0020918 A1 | 1/2003 | Murakowski et al. |
| 2003/0160148 A1 | 8/2003 | Yao et al. |
| 2004/0109217 A1 | 6/2004 | Maleki et al. |
| 2004/0240781 A1 | 12/2004 | Savchenkov et al. |
| 2005/0063034 A1 | 3/2005 | Maleki et al. |
| 2005/0074200 A1 | 4/2005 | Savchenkov et al. |
| 2005/0123306 A1 | 6/2005 | Ilchenko et al. |
| 2005/0128566 A1 | 6/2005 | Savchenkov et al. |
| 2005/0175358 A1 | 8/2005 | Ilchenko et al. |
| 2005/0185681 A1 | 8/2005 | Ilchenko et al. |
| 2005/0196103 A1 | 9/2005 | Kaplan |
| 2005/0248823 A1 | 11/2005 | Maleki et al. |
| 2007/0009205 A1 | 1/2007 | Maleki et al. |
| 2007/0153289 A1 | 7/2007 | Yilmaz et al. |
| 2008/0075464 A1 | 3/2008 | Maleki et al. |
| 2008/0310463 A1 | 12/2008 | Maleki et al. |
| 2009/0091763 A1* | 4/2009 | Park et al. .................. 356/460 |
| 2009/0097516 A1 | 4/2009 | Maleki et al. |
| 2009/0135860 A1 | 5/2009 | Maleki et al. |
| 2009/0208205 A1 | 8/2009 | Eliyahu et al. |
| 2009/0251705 A1 | 10/2009 | Le et al. |
| 2009/0310629 A1 | 12/2009 | Maleki et al. |
| 2009/0324251 A1 | 12/2009 | Ilchenko et al. |
| 2010/0118375 A1 | 5/2010 | Maleki et al. |
| 2010/0264300 A1 | 10/2010 | Savchenkov et al. |
| 2011/0097078 A1 | 4/2011 | Eliyahu et al. |
| 2011/0110387 A1 | 5/2011 | Maleki et al. |
| 2011/0150485 A1 | 6/2011 | Seidel et al. |
| 2011/0255094 A1 | 10/2011 | Mohageg et al. |

FOREIGN PATENT DOCUMENTS

| | | |
|---|---|---|
| WO | 0004074 A1 | 1/2000 |
| WO | 0004925 A1 | 2/2000 |
| WO | 0159497 A1 | 8/2001 |
| WO | 0171401 A1 | 9/2001 |
| WO | 0196913 A1 | 12/2001 |
| WO | 0196936 A1 | 12/2001 |
| WO | 0213337 A1 | 2/2002 |
| WO | 03088472 A2 | 10/2003 |
| WO | 2004044624 A2 | 5/2004 |
| WO | 2004070432 A2 | 8/2004 |
| WO | 2005017607 A2 | 2/2005 |
| WO | 2005033749 A2 | 4/2005 |
| WO | 2005038513 | 4/2005 |
| WO | 2005067690 | 7/2005 |
| WO | 2005101286 A2 | 10/2005 |
| WO | 2006076585 | 7/2006 |
| WO | 2006099616 A2 | 9/2006 |
| WO | 2008030782 A2 | 3/2008 |
| WO | 2008075464 A1 | 6/2008 |
| WO | 2008153559 A2 | 12/2008 |
| WO | 2008154656 A2 | 12/2008 |
| WO | 2009051730 A1 | 4/2009 |
| WO | 2009064478 A2 | 5/2009 |
| WO | 2009064934 A2 | 5/2009 |
| WO | 2009064935 A2 | 5/2009 |
| WO | 2009114163 A2 | 9/2009 |
| WO | 2009137202 A2 | 11/2009 |
| WO | 2011038166 A2 | 3/2011 |
| WO | 2011119232 A2 | 9/2011 |

OTHER PUBLICATIONS

Eliyahu, D., et al., "Low Phase Noise and Spurious Levels in Multi-Loop Opto-Electronic Oscillators," Proceedings of the 2003 IEEE International Frequency Control Sympsoium and PDA Exhibition, pp. 405-410, May 2003.

Eliyahu, D., et al., "Modulation Response (S21) of the Coupled Opto-Electronic Oscillator," Proceedings of the 2005 IEEE International Frequency Control Symposium and Exposition, pp. 850-856, Aug. 2005.

Eliyahu, D., et al., "Tunable, Ultra-Low Phase Noise YIG Based Opto-Electronic Oscillator," IEEE MTT-S International Microwave Symposium Digest, 3:2185-2187, Jun. 2003.

Gorodetsky, M.L., et al., "Optical Microsphere Resonators: Optimal Coupling to High-Q Whispering-Gallery Modes," J. Opt. Soc. Am. B, 16(1):147-154, Jan. 1999.

Gorodetsky, M.L., et al., "Rayleigh Scattering in High-Q Microspheres," J. Opt. Soc. Am. B, 17(6):1051-1057, Jun. 2000.

Gorodetsky, M.L., et al., "Ultimate Q of Optical Microsphere Resonators," Optics Letters, 21(7):453-455, Apr. 1996.

Hryniewicz, J.V., et al., "Higher Order Filter Response in Coupled Microring Resonators," IEEE Photonics Technology Letters, 12(3):320-322, Mar. 2000.

Huang, S., et al., "A 'Turnkey' Optoelectronic Oscillator with Low Acceleration Sensitivity," 2000 IEEE/EIA International Frequency Control Symposium and Exhibition, pp. 269-279, Jun. 2000.

Ilchenko, V., et al., "Electrooptically Tunable Photonic Microresonators and Photonic Bandgap Waveguide Coupling for Micro-Optoelectronic Oscillators," GOMACTech 2003, Tampa, Florida, pp. 1-4.

Ilchenko, V., et al., "High-Q Microsphere Cavity for Laser Stabilization and Optoelectronic Microwave Oscillator," Proceedings SPIE Microresonators and Whispering-Gallery Modes, vol. 3611, pp. 190-198, Jan. 1999.

Ilchenko, V., et al., "Microsphere Integration in Active and Passive Photonics Devices," Proc. of SPIE Laser Resonators III, vol. 3930, pp. 154-162, Jan. 2000.

Ilchenko, V., et al., "Microtorus: A High-Finesse Microcavity with Whispering-Gallery Modes," Optics Letters, 26 (5):256-258, Mar. 2001.

Ilchenko, V., et al., "Pigtailing the High-Q Microsphere Cavity: A Simple Fiber Coupler for Optical Whispering-Gallery Modes," Optics Letters, 24(11):723-725, Jun. 1999.

Ilchenko, V., et al., "Sub-Micro Watt Photonic Microwave Receiver," IEEE Photonics Technology Letters, 14 (11):1602-1604, Nov. 2002.

Ilchenko, V., et al., "Tunability and Synthetic Lineshapes in High-Q Optical Whispering Gallery Modes," Proc. of SPIE Laser Resonators and Beam Control VI, vol. 4969, pp. 195-206, Jan. 2003.

Ilchenko, V., et al., "Whispering-Gallery-Mode Electro-Optic Modulator and Photonic Microwave Receiver," J. Opt. Soc. Am. B, 20(2):333-342, Feb. 2003.

International Search Report and Written Opinion mailed on Nov. 22, 2011 for International Application No. PCT/US2011/000543, filed Mar. 23, 2011 (8 pages).

Ito, H., et al., "InP/InGaAs Uni-Travelling-Carrier Photodiode with 310 GHz Bandwidth," Electronics Letters, 36 (21):1809-1810, Oct. 2000.

Logan, R., et al., "Stabilization of Oscillator Phase Using a Fiber-Optic Delay-Line," IEEE 45th Annual Symposium on Frequency Control, pp. 508-512, May 1991.

Maleki, L., "The Opto-Electronic Oscillator: Prospects for Extending the State of the Art in Reference Frequency Generation," International Topical Meeting on Microwave Photonics, pp. 195-198, Oct. 1998.

Maleki, L., et al., Practical Applications of Microresonators in Optics and Photonics, Chapter 3: "Crystalline Whispering Gallery Mode Resonators in Optics and Photonics," pp. 133-209, Ed. by A. B. Matsko, CRC Press, 2009.

Matsko, A., et al., "Active Mode Locking with Whispering-Gallery Modes," J. Opt. Soc. Am. B, 20(11):2292-2296, Nov. 2003.

Matsko, A., et al., "Whispering-Gallery-Mode based Optoelectronic Microwave Oscillator," Journal of Modern Optics, 50(15-17):2523-2542, Feb. 2004.

Matsko, A., et al., "Whispering-Gallery-Mode Resonators as Frequency References. I. Fundamental Limitations," J. Opt. Soc. Am. B, 24(6):1324-1335, Jun. 2007.

Myers, L.E., et al., "Quasi-Phase-Matched Optical Parametric Oscillators in Bulk Periodically Poled LiNbO3," J. Opt. Soc. Am. B, 12(11):2102-2116, Nov. 1995.

Savchenkov, A., et al., "Low Threshold Optical Oscillations in a Whispering Gallery Mode CaF2 Resonator," Physical Review Letters, 93(24):243905(1-4), Dec. 2004.

Savchenkov, A., et al., "Morphology-dependent photonic circuit elements," Optics Letters, 31(9):1313-1315, May 2006.

Savchenkov, A., et al., "Optical combs with a crystalline whispering gallery mode resonator," arXiv:0804.0263v1 [physics.optics], Apr. 2008.

Savchenkov, A., et al., "Whispering-Gallery-Mode Resonators as Frequency References. II. Stabilization," J. Opt. Soc. Am. B, 24(12):2988-2997, Dec. 2007.

Vassiliev, V.V., et al., "Narrow-Line-Width Diode Laser with a High-Q Microsphere Resonator," Optics Communications, 158(1-6):305-312, Dec. 1998.

Yao, X.S., et al., "A Novel Photonic Oscillator," Digest of the LEOS Summer Topical Meetings, pp. 17-18, Aug. 1995.

Yao, X.S., et al., "A Novel Photonic Oscillator," TDA Progress Report 42-122, pp. 32-43, Aug. 1995.

Yao, X.S., et al., "Converting Light into Spectrally Pure Microwave Oscillation," Optics Letters, 21(7):483-485, Apr. 1996.

Yao, X.S., et al., "Coupled Optoelectronic Oscillators for Generating Both RF Signal and Optical Pulses," Journal of Lightwave Tecnhology, 18(1):73-78, Jan. 2000.

Yao, X.S., et al., "Dual Microwave and Optical Oscillator," Optics Letters, 22(24):1867-1869, Dec. 1997.

Yao, X.S., et al., "Multiloop Optoelectronic Oscillator," IEEE Journal of Quantum Electronics, 36(1):79-84, Jan. 2000.

Yao, X.S., et al., "Optoelectronic Microwave Oscillator," J. Opt. Soc. Am. B, 13(8):1725-1735, Aug. 1996.

Yao, X.S., et al., "Optoelectronic Oscillator for Photonic Systems," IEEE Journal of Quantum Electronics, 32 (7):1141-1149, Jul. 1996.

Yu, J., et al., "Compact Optoelectronic Oscillator with Ultra-Low Phase Noise Performance," Electronics Letters, 35 (18):1554-1555, Sep. 1999.

* cited by examiner

OPTICAL GYROSCOPE SENSORS BASED ON OPTICAL WHISPERING GALLERY MODE RESONATORS

PRIORITY CLAIMS AND RELATED APPLICATIONS

This patent document claims the benefits of three U.S. Provisional Applications: Provisional Application No. 61/316,621 entitled "Compact Optical Gyroscope Based on Injection Locked Laser-Whispering Gallery Mode Resonator" and filed Mar. 23, 2010, Provisional Application No. 61/357,211 entitled "An active rotation sensor based on passively mode locked laser from simulated Raman scattering in a monolithic solid state resonator" and filed Jun. 22, 2010, and Provisional Application No. 61/359,490 entitled "Passive, closed-loop gyroscopes based on optical whispering gallery mode resonators" and filed Jun. 29, 2010. The entire disclosure of the above three U.S. applications is incorporated by reference as part of this document.

BACKGROUND

This document relates to devices and techniques for using an optical gyroscope sensor to measure rotations.

Optical gyroscopes can be constructed in an optical ring interferometer configuration based on the Sagnac effect where an optical beam is split into two counter-propagating beams in an optical ring. The two counter-propagating beams experience different phase shifts caused by the rotation of the optical ring and the optical interference pattern of the two counter-propagating beams is obtained to measure the magnitude and direction of the rotation rate of the optical ring.

SUMMARY

This document discloses, among others, examples and implementations of devices and techniques for using an optical gyroscope sensor to measure rotations based on rotation-induced optical phase shift in optical whispering gallery mode resonators.

DETAILED DESCRIPTION

In one implementation, an optical gyroscope device is provided to include a laser that produces laser light; an optical resonator fixed in position relative to the laser and made of an optical material and structured to support optical whispering gallery modes that propagate in opposite directions in a closed optical loop in the optical resonator; an optical coupler fixed relative to the optical resonator and evanescently coupled to the optical resonator to couple the laser light into one or more optical whispering gallery modes of the optical resonator and to couple the laser light in a particular optical whispering gallery mode inside the optical resonator as an injection laser beam back to the laser to cause injection locking of the laser to the particular optical whispering gallery mode; a beam splitter fixed in position in an optical path of the laser light between the laser and the optical coupler to split a portion of the laser propagating towards the optical coupler as a first laser beam and to split a portion of the injection laser beam propagating towards the laser into a second laser beam; a beam combiner fixed in position relative to the beam splitter to receive the first and second laser beam and to spatially overlap the received first and second laser beams to produce a combined laser beam; and an optical detector that receives the combined laser beam to produce a detector output that contains phase shift information in the optical interference between the first and second laser beams indicating a rotation of the optical resonator.

Figure 1:
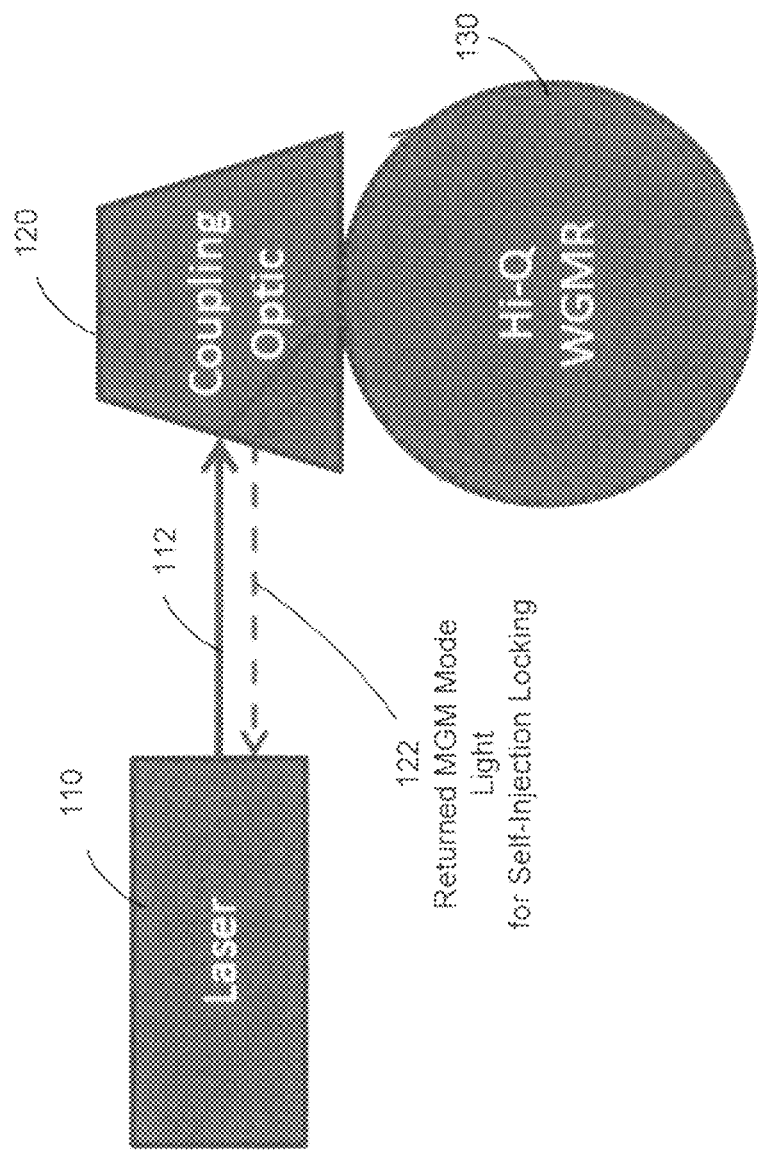
FIG. 1 shows an example of a laser that is locked in frequency to an optical whispering gallery mode (WGM) resonator via self injection locking.

The laser and the optical WGM resonator can be locked to each other in frequency by injection locking. Referring to FIG. 1, the laser light 112 from the laser 110 is coupled to a WGM resonator WGMR 130 via an evanescent optical coupler 120 such as a prism coupler. By virtue of the material inhomogeneity of the WGMR host material, some fraction of that laser light is back reflected into a frequency degenerate, counter-propagating mode. This counter-propagating mode exits the coupling optic through the same path as the input light; it is thus coupled back to the laser.

The light 122 returning to the laser 110 acts as an injected wave. The oscillation frequency of the laser 110 is pulled towards the injected wave frequency. There is a practical limit to the range of oscillation frequencies that can be pulled towards the injection frequency. This is called the "Locking Range" or "Locking Bandwidth", and is expressed as $$\Delta\omega = \frac{2\omega_0}{Q_L}\sqrt{\frac{I_{inj}}{I_L}}$$

Here, $\Delta\omega$ is the "Locking Range", $\omega_o$ is the laser frequency, $Q_L$ is the laser cavity quality factor, $I_L$ is the laser output intensity, and $I_{inj}$ is the injected signal intensity. $I_{inj}$ is directly related to the WGMR Q-factor. A larger locking range is achieved with a high-Q resonator as compared to a low-Q resonator.

The frequency of the resonator mode is $\omega_1$. While the oscillation frequency $\omega_o$ is pulled towards the mode frequency $\omega_1$, so long as the difference between the two frequencies is less than $\Delta\omega$, the process of changing frequency takes a finite time to complete. During this time, as the frequency of oscillation is pulled towards the resonator frequency, the phase relationship between the two waves shifts through zero. The magnitude of the starting phase is characterized by the Adler Equation. The solution to the Adler equation in the regime where the oscillating wave is detuned from the injected wave, and the difference between the two wave frequencies is within the locking range, is $$\varphi(\omega_1) = \arcsin\cdot\left(\frac{\omega_0 - \omega_1}{\Delta\omega/2}\right)$$

Here, $\phi$ is the relative phase between the injected wave and the oscillator wave. By inspection of the equation, it is clear that when the two wave frequencies are equal to each other, the relative phase between them is zero. When the oscillator wave is at $\pm\Delta\omega/2$, the argument of the arcsin is $\pm 1$, which predicts a relative phase of $\pm 90$ degrees. The relative phase is smoothly varying within the locking range.

In the limit of zero detuning, or nearly zero detuning, the transient relative phase difference between the two waves is expressed as $$\varphi(t) \cong \varphi(\omega_1)\cdot\exp\left[\frac{-\Delta\omega}{2}t\right]$$

Figure 2:
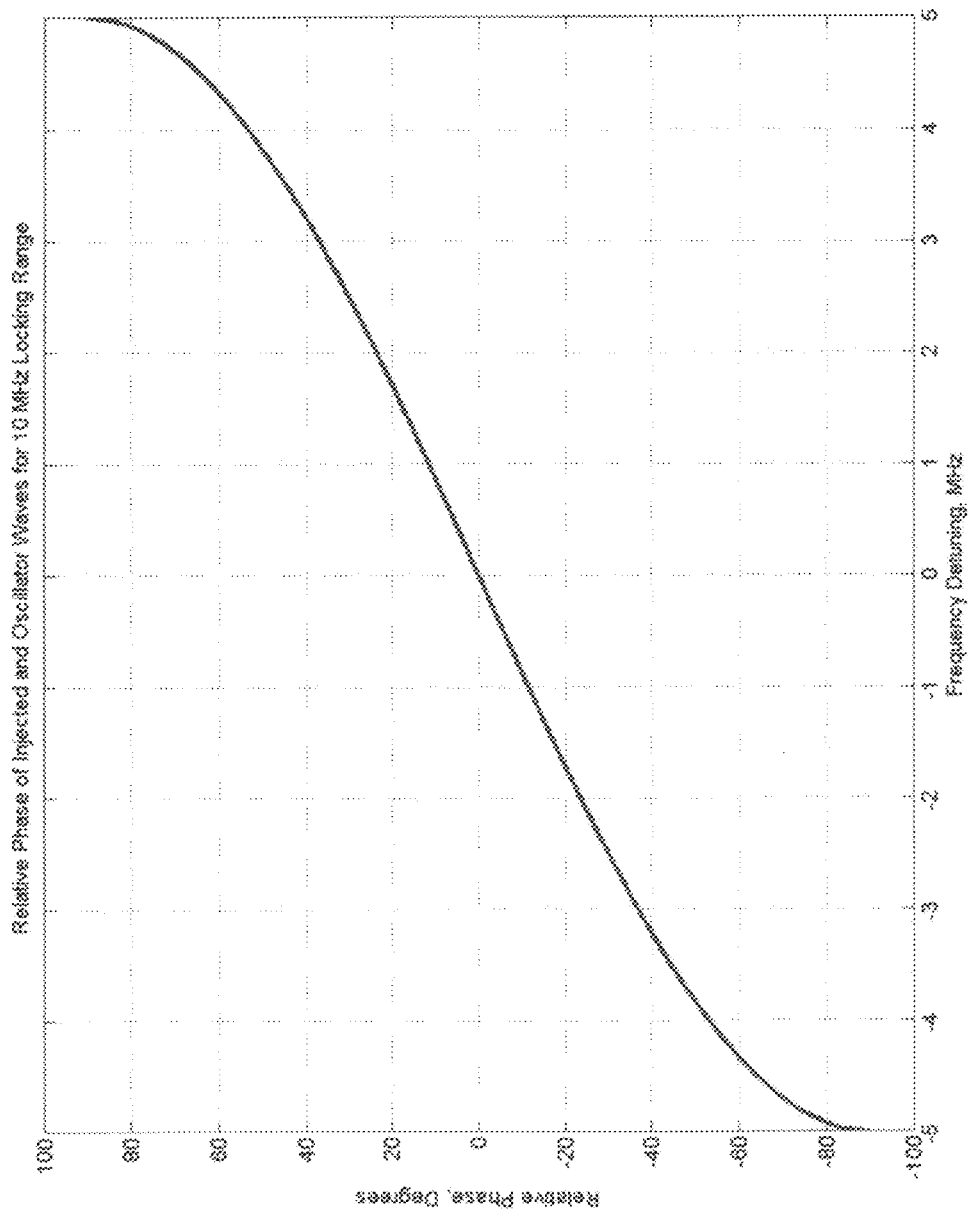
FIG. 2 shows a relative phase with respect to the frequency detuning in the self-injection locking in FIG. 1.

FIG. 2 shows the relative phase with respect to the frequency detuning in an example setup.

Figure 3:
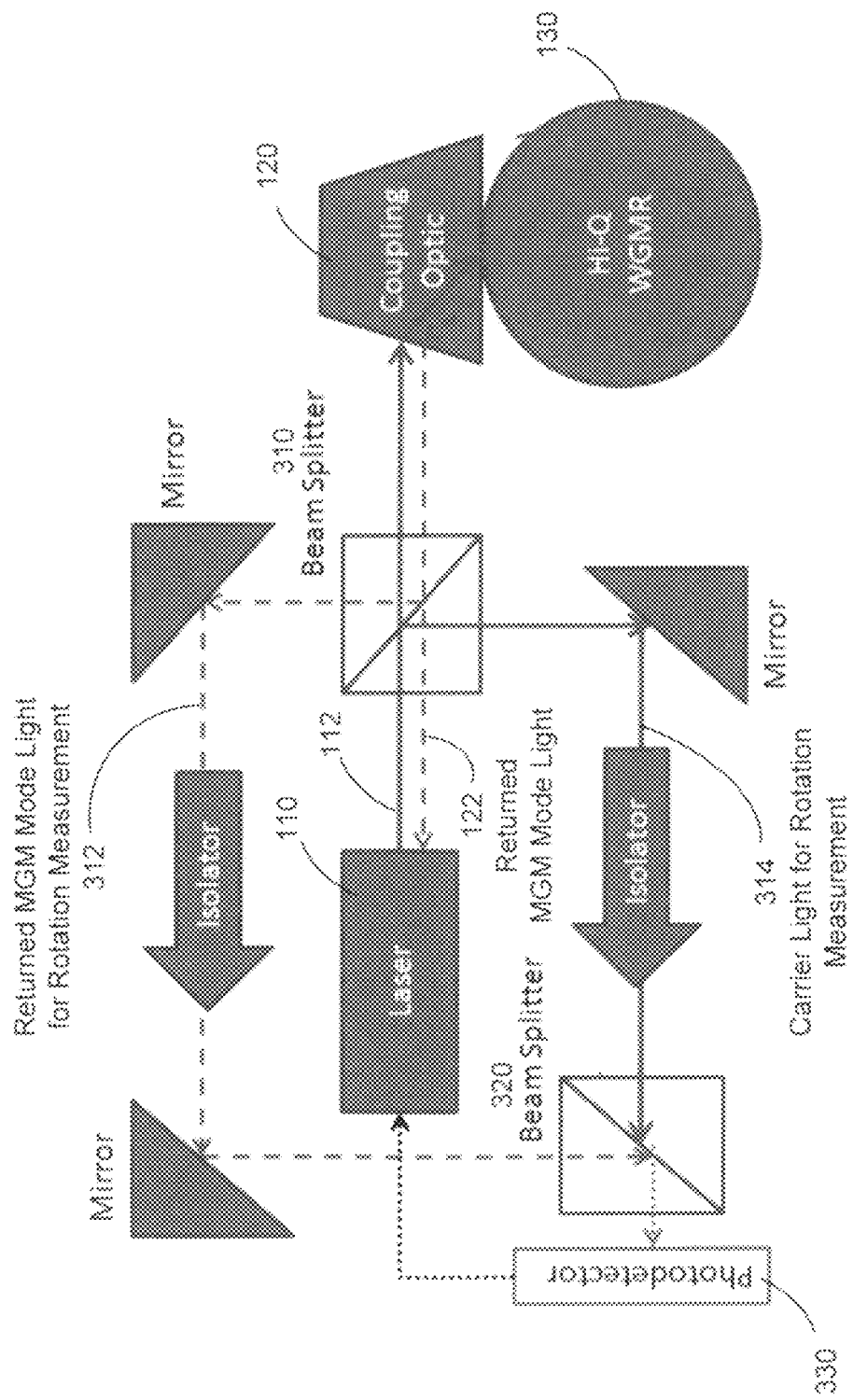
FIGS. 3, 4, 5 and 6 illustrate examples of optical gyroscopes by using the rotation of the optical WGM resonator to produce a phase shift in the light coupled in one or more WGM modes inside the WGM resonator.

FIG. 3 shows an example of a gyroscope based on injection locking that has rotation sensitivity. An interferometer is used to compare the phase of the two waves that are very nearly the same frequency. This interferometer is formed by the beam splitter 310 between the laser 110 ands the resonator 120 that splits a portion of the laser beam 112 into a carrier light 314 for rotation measurement while allowing the rest going into the resonator 130. A portion of the returned light 122 is split by the beam splitter 310 as the MGM mode light 312. A beam combiner 320 combines the beams 312 and 314 into a combine beam and thus causes optical interference between the beams 312 and 314. The optical detector 330 converts the combined beam into a detector signal that contains information on the rotation of the optical resonator 130.

The intensity, I, incident upon the photodetector face is $$I = 2\sin^2\left(\frac{\varphi_1 - \varphi_0}{2}\right)$$

The fringe pattern intensity, converted to a current by the photodetector, is fed back to the laser to keep the frequency offset nearly zero.

Rotation will cause the WGMR frequency to shift. A rotation of the system results in a phase shift in all the circulating waves present through the Sagnac effect. The phase shift of the WGM's is larger than the phase shift of all other waves by a factor of cavity finesse. A phase shift in the mode is equivalent to a frequency shift of the mode resonant frequency. The frequency shift, $\Delta f$, of the mode due to rotation is expressed as $$\frac{\Delta f}{\omega_1} = -\frac{Rn}{\pi c}\cdot\Omega$$

For rotation rate $\Omega$, and resonator radius R. The refractive index of the medium is n, and c is the speed of light in vacuum. Note that the frequency shift refers to the optical frequency of the WGM, not to the free spectral range (FSR) of the resonator. The rotation of the system causes the resonant frequency of the mode to shift. That shift in resonant frequency results in a relative phase difference between the injection wave and the oscillator wave. That relative phase difference is converted to a current via the action of the interferometer.

The simple setup shown above serves only to demonstrate the principle of operation of the gyroscope. It has some inherent limitations. These are 1) Insensitivity to the sense of rotation, 2) Positive feedback to the laser, and 3) Open loop operation of the gyroscope.

Figure 4:
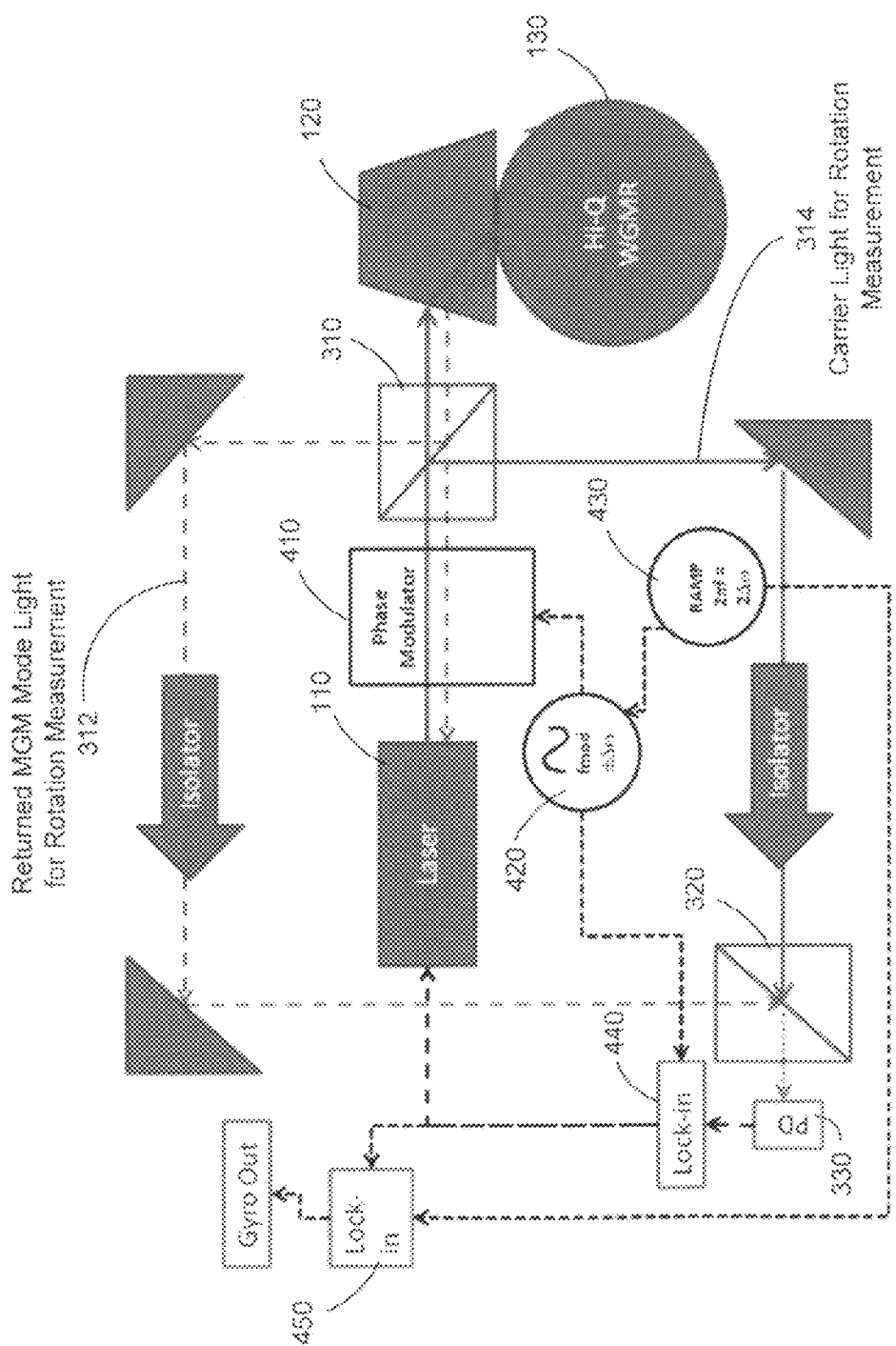

FIG. 4 shows an example with lock loops in the optical gyroscope. An optical modulator 410, e.g., a phase modulator, is added to the path of the beam exiting and entering the laser cavity. Practically, this is achieved by using an EML unit. The laser frequency is detuned from the resonator line by several multiples of the locking range. The modulator is driven at an appropriate frequency from a signal source 420 to bring one sideband of the modulated laser within the locking range. The modulator frequency is determined by a sawtooth shaped ramp signal generated by the ramp signal source 430. The frequency of the modulator 410 is swept between $-\Delta\omega$ and $+\Delta\omega$ of the appropriate center frequency to bring one sideband into the locking range.

Figure 5:
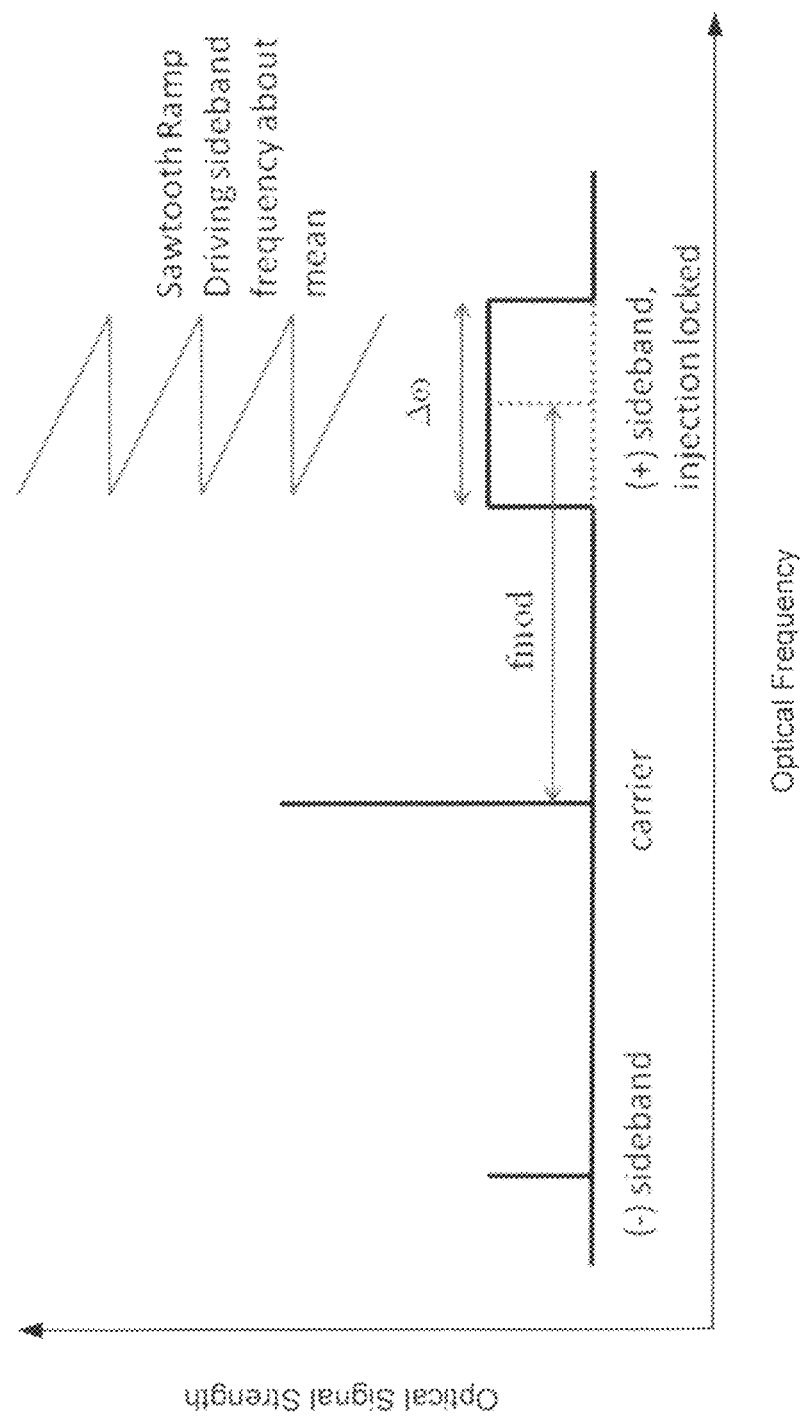

Referring to FIG. 5, the rate of the frequency ramp is greater than twice the locking range of the circuit. This rate is selected to effectively sweep the locking frequency across the resonator mode frequency fast enough to prevent the phase transient described above, while slow enough to be demodulated later in the circuit. A lock-in amplifier 440, or phase shifter, mixer, amplifier, and servo, is used to demodulate the photodetector 330 signal to produce feedback to the laser. This control signal is demodulated with respect to the sawtooth ramp to produce a final Gyro Output that indicates the rotation of the optical resonator 130.

The Sagnac Scale Factor of the interferometer is, in units of seconds $$\delta\Omega = \frac{\sqrt{2}\lambda_{res}}{2\pi R}\cdot\frac{BW}{\sqrt{\frac{I}{A\hbar\omega_1}\eta\tau}}$$

In the expression, BW is the WGMR loaded linewidth, A is the spot size of the interferogram incident upon the photodetector, and $\eta$ is the photodetector quantum efficiency. To evaluate the shot-noise limited sensitivity, the following parameters were used: 1) a buffering time of 12 kHz, 2) a spot size of 200 µm diameter, 3) incident intensity of 100 µW, 4) wavelength of 1550 nm, 5) resonator radius of 5 mm, 6) quantum efficiency of 0.95, and 7) resonator bandwidth of 100 kHz. The calculated shot-noise limited resolution in this, rather conservative configuration, is 500µ°/hr. This level of sensitivity beats navigation grade fiber optic gyroscopes by more than two orders of magnitude.

It should be noted that the RIN of the source laser, the efficiency of the modulator, and the noise related to modulation and demodulation all contribute to the resolution limit of the gyroscope. The gyroscope is temperature sensitive as n, R, and the laser frequency are temperature dependent. These temperature dependencies can be calibrated out of the system. A qualitative description follows.

Figure 6:
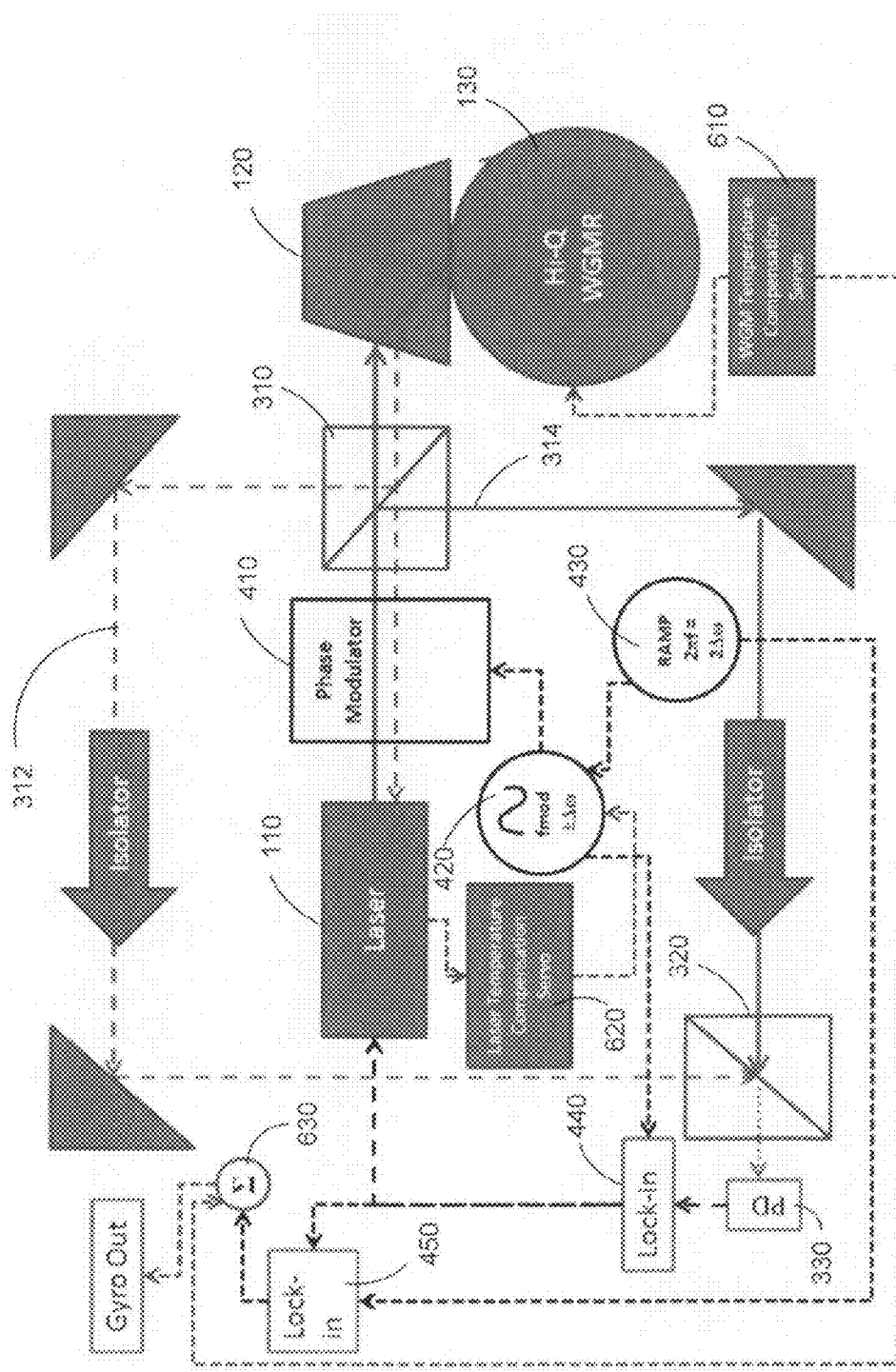

The temperature dependence of n and R results in a linear change of the SSF. To compensate for this, a temperature sensor can be placed near the WGMR to characterize the local temperature. This value can be appropriately weighted then summed with the output to correct for temperature drifts. Referring to FIG. 6, a WGMR temperature compensation servo circuit is used to use the sensor output to produce a correction to the gyro output to compensate for a change in the resonator temperature.

The temperature dependence of the laser also results in a linear change of the SSF, as well as a shift of the signal at zero-rotation, called in the literature the "bias drift." For small variations, the change in laser wavelength with temperature is linear. Hence, a laser temperature sensor can be used to measure the laser temperature. Active thermal stabilization can be used to stabilize the laser temperature by a laser temperature control circuit. A control servo circuit can also be used to shift the central modulation frequency of the source 420 based on the laser sensor reading to compensate for the laser drift.

In addition to the scale factor stability and bias drift, power in the carrier and un-used sideband will contribute to a permanent bias offset. The bias offset can be calibrated out by adding a dc term to the summing amplifier before the gyro output.

FIGS. 7-10 show another example of a gyroscope design. This optical gyroscope device includes a laser that produces laser light at a laser carrier frequency; an optical set up that splits the laser light into a first laser beam and a second laser beam in opposition directions; an optical resonator fixed in position relative to the laser and made of an optical material and structured to support optical whispering gallery modes that propagate in opposite directions in a closed optical loop in the optical resonator; a first optical modulator in a path of the first beam to modulate the first laser beam to produce a first modulated laser beam; and a second optical modulator in a path of the second beam to modulate the second laser beam to produce a second modulated laser beam. This device also includes an input optical coupler fixed in position relative to the optical resonator and evanescently coupled to the optical resonator to couple the first modulated laser beam into one or more optical whispering gallery modes of the optical resonator circulating in the optical resonator in a first direction and to couple second modulated laser beam into the optical resonator circulating in a second direction opposite to the first direction; and an output optical coupler fixed in position relative to the optical resonator and evanescently coupled to the optical resonator to couple the first modulated laser beam out of the optical resonator as a first output beam and to couple the second modulated laser beam out of the optical resonator as a second output beam. A first optical filter is provided to filter the first output beam to remove light at the laser carrier frequency to produce filtered first output beam. A second optical filter is provided to filter the second output beam to remove light at the laser carrier frequency to produce filtered second output beam. A first optical detector is provided to receive the filtered first output beam to produce a first detector signal. A second optical detector is provided to receive the filtered second output beam to produce a second detector signal. A laser lock circuit stabilizes the laser in frequency. A first lock circuit controls the first optical modulator based on the first detector signal to stabilize a frequency of the first modulated laser beam at a first whispering gallery mode of the optical resonator. A second lock circuit controls the second optical modulator based on the second detector signal to stabilize a frequency of the second modulated laser beam at a second whispering gallery mode of the optical resonator. A signal mixer is provided to mix outputs of the first and second lock circuits to produce a gyro output indicating a rotation of the optical resonator.

Figure 7:
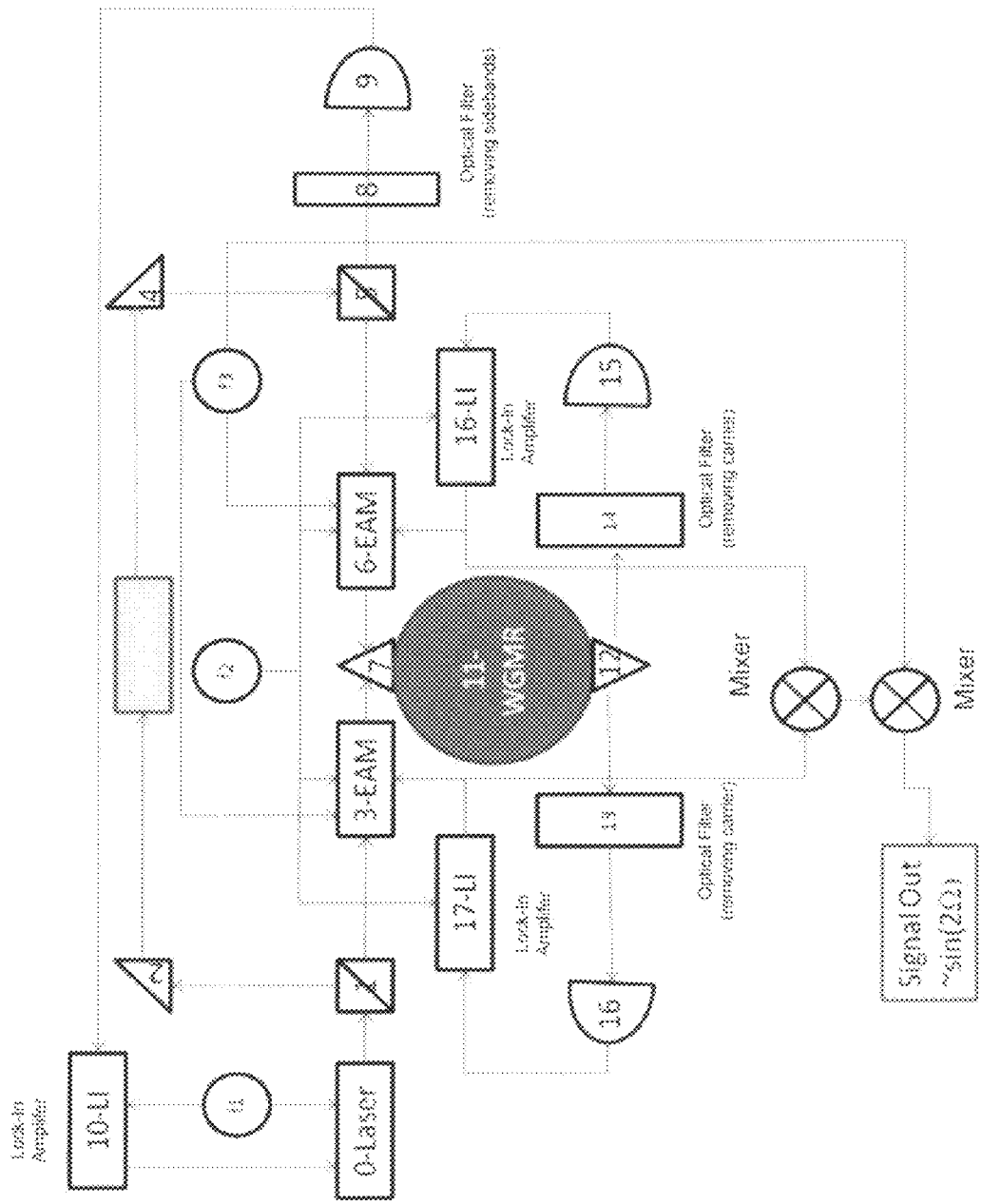
FIGS. 7, 8, 9 and 10 illustrate an example of an optical gyroscope by using a single source laser, two optical modulators and the rotation of the optical WGM resonator to produce a phase shift in the light coupled in one or more WGM modes inside the WGM resonator based on multiple lock loops for stabilizing the two counter propagating light beams in WGM modes in the WGM resonator.
Figure 8:
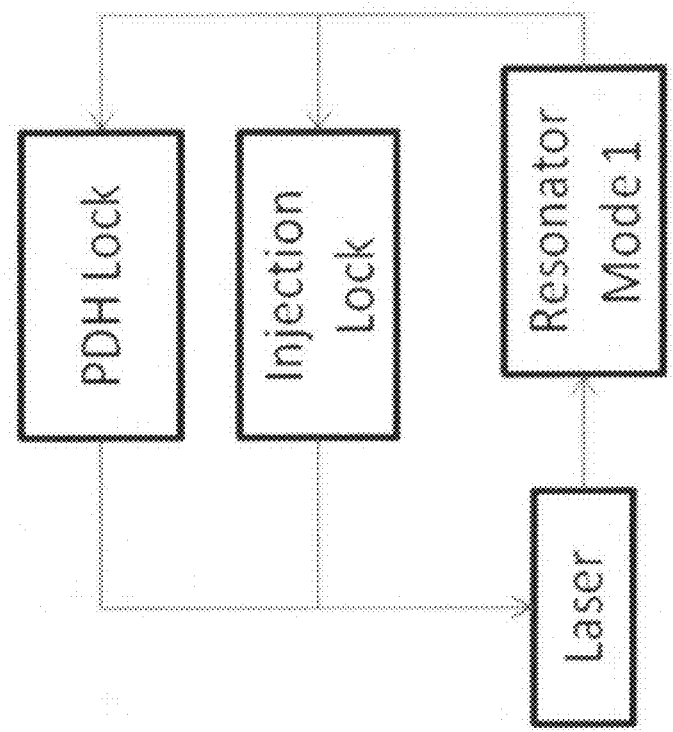

FIG. 7 shows a specific example where the optical modulator is implemented by an electro absorption modulator (EAM) as an example. This layout includes five interwoven loop structures. The first two loop structures serve to lock and stabilize a laser to a high-Q WGMR, and are shown diagrammatically in FIG. 8. The first and second loop stabilizes the laser/resonator system. Co-resonance is insured regardless of temperature differences, environmental factors, or rotational state.

The first loop consists of a laser (item 0), a prism (item 7), and a high-Q WGMR (item 11.) Laser light is coupled to a high-Q resonator mode using the prism. Back scattering of light inside the resonator injection locks the laser wavelength to the resonator mode. This results in significant line narrowing of the laser source.

The second loop consists of the laser, the prism, the resonator, the output beam splitter (item 5) the WDM filter (item 8), a photodetector (item 9), a frequency source f1 and a lock-in amplifier circuit (item 10.) Modulated laser light reflected from the resonator-prism interface is filtered and picked up by a photodetector. The electrical PD signal is demodulated and fed back to the laser. This is a Pound-Drever-Hall lock of the laser to the resonator mode. Where the injection locking narrows the laser linewidth, the PDH lock increases stability of the lock.

Figure 9:
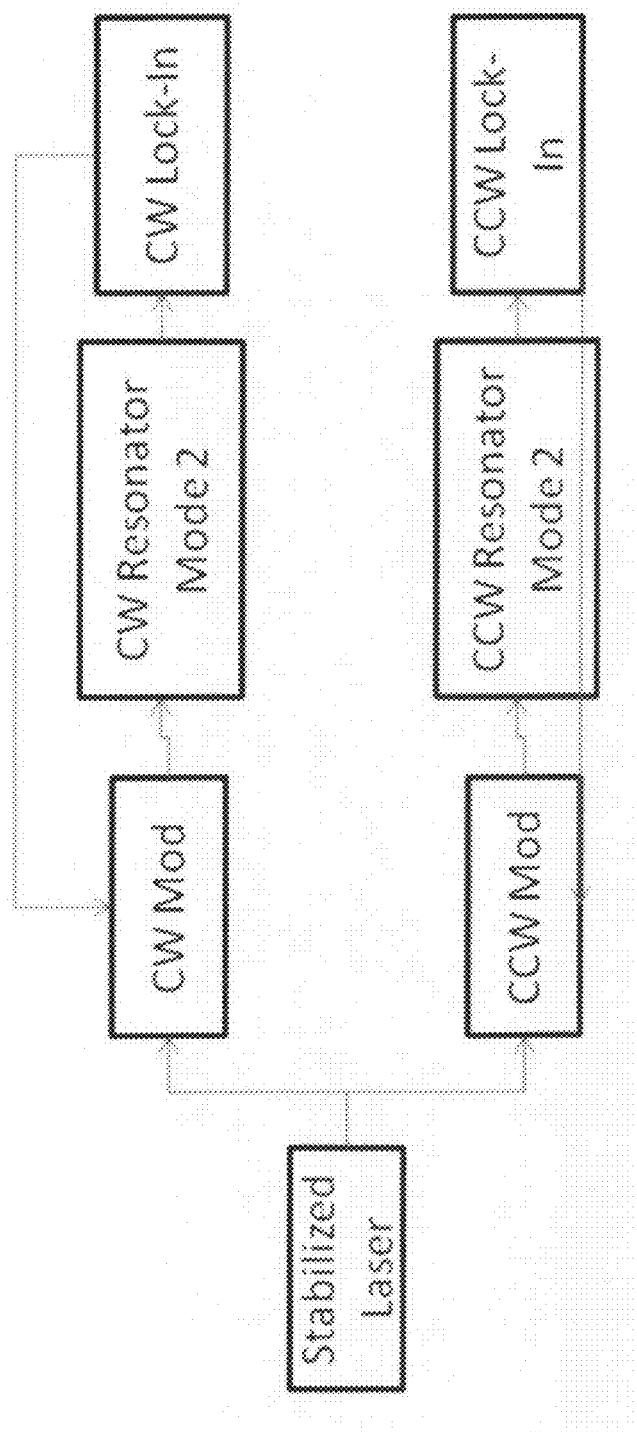
Figure 10:
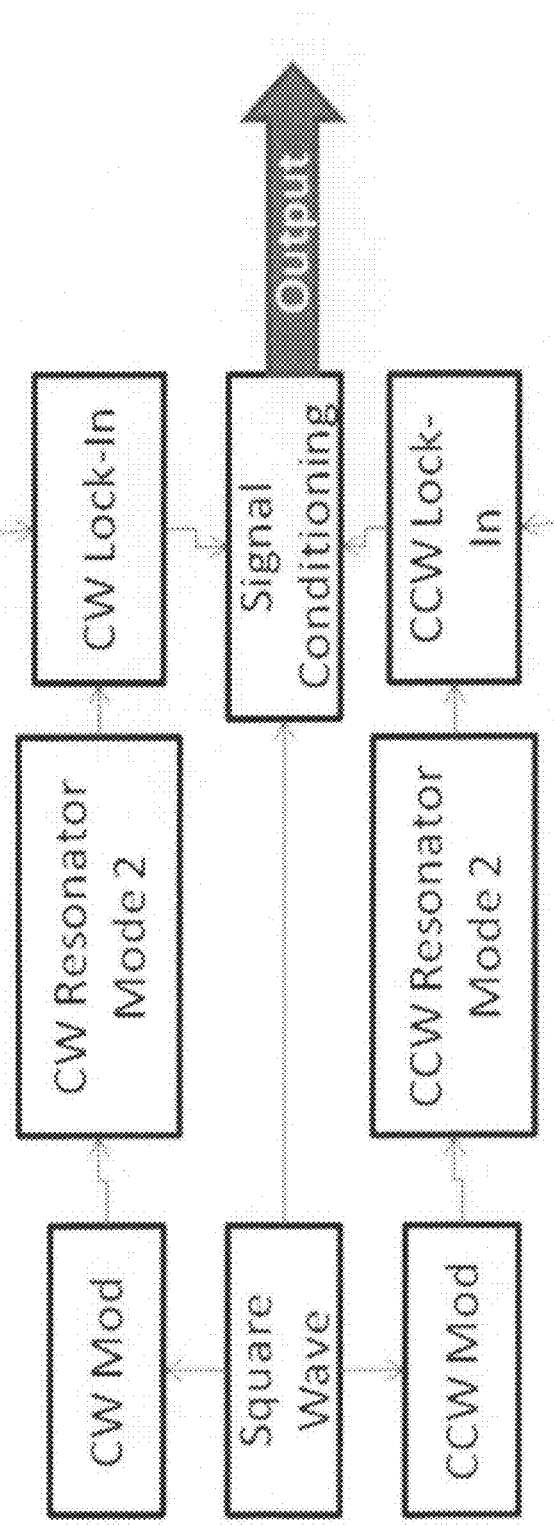

Referring to FIG. 9, loops 3 and 4 serve to keep the CW and CCW propagating resonator modes coincident with some laser energy. At the zero rotation rate, the WGMR has an additional mode separated in frequency from the mode used for locking (by loops 1 and 2) by f2. This mode is called resonator mode-2. A pair of EAM's are placed in the CW and CCW direction and are driven by an oscillator generating f2. The output of each EAM, in frequency space, is a carrier at the stabilized laser wavelength, a sideband coincident with resonator mode 2, and a sideband that is not coincident with any mode. This second sideband is not used in the circuit. Through prism 12 and the WDM filter and PD on either channel, resonator mode-2 is transmitted. The PD signal is mixed with the oscillator signal f2. The demodulated signal is amplified and fed back to either EAM. As the resonator rotates, the apparent frequency of resonator mode-2 shifts in opposite directions for the CCW and CW modes. Thus, a slightly larger or slightly smaller frequency modulation than f2 is required to maintain coincidence of the CW and CCW mode with resonator mode-2. Loops 3 and 4 force the sideband of the modulated beam to maintain coincidence with resonator mode-2 through any rotation.

Loops 1-4 have produced a pair of sidebands that are permanently locked to a resonator mode as it splits in frequency through rotation. If the temperature of the laser shifts, the injection lock and PDH lock force the laser back to the frequency of resonator mode-1. If the temperature of the resonator shifts, the laser frequency shifts along with it. However, the difference of the CW and CCW sideband frequencies remains constant over a wide temperature range. Loop 5, shown diagrammatically in FIG. 10, adds a square-wave modulation at frequency f3 to the signal going to the EAMs. This square wave serves two purposes. First, the magnitude of modulation is selected so that when the square wave is "on", the optical phase difference of the two paths is shifted by 90-degrees. This enables sensitivity to direction of rotation. The second benefit of the square wave servo is to completely demodulate the output signal, producing a transducer like response to inertial rotation that crosses through zero volts at zero rotation.

Figure 11:
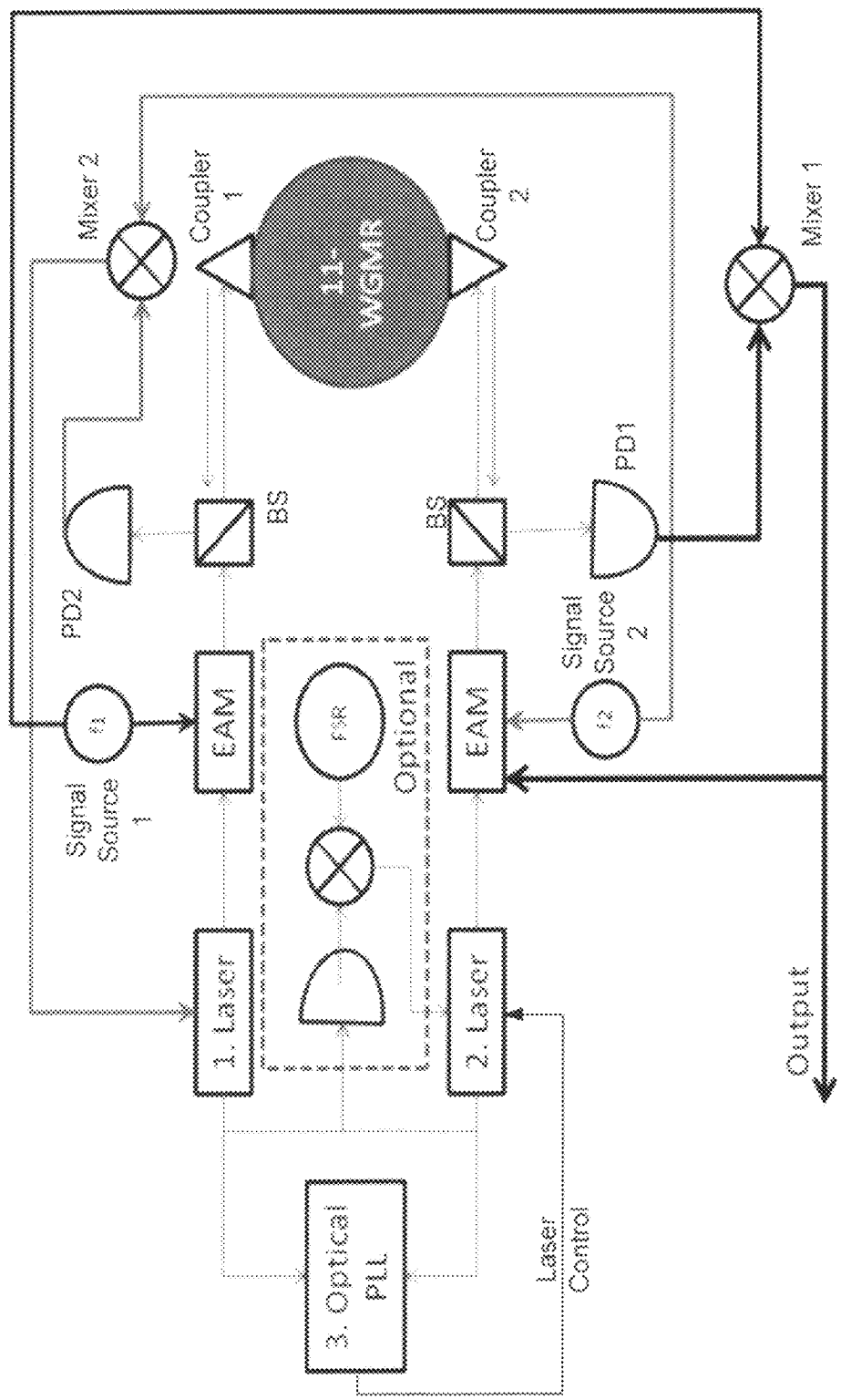
FIG. 11 illustrates an example of an optical gyroscope by using two source lasers, two optical modulators and the rotation of the optical WGM resonator to produce a phase shift in the light coupled in one or more WGM modes inside the WGM resonator based on multiple lock loops for stabilizing the two counter propagating light beams in WGM modes in the WGM resonator.

FIG. 11 shows another example of a gyroscope design. In this example, the optical gyroscope device includes a first laser that produces first laser light at a first laser carrier frequency; a second laser that produces second laser light at a second laser carrier frequency; a laser lock circuit that stabilizes the second laser relative to the first laser in frequency; a first optical modulator that modulates the first laser beam at a first modulation frequency to produce a first modulated laser beam; a second optical modulator that modulates the second laser beam at a second modulation frequency to produce a second modulated laser beam; an optical resonator fixed in position relative to the first and second lasers and made of an optical material and structured to support optical whispering gallery modes that propagate in opposite directions in a closed optical loop in the optical resonator; a first optical coupler fixed in position relative to the optical resonator and evanescently coupled to the optical resonator to couple the first modulated laser beam into one or more optical whispering gallery modes of the optical resonator circulating in the optical resonator in a first direction and to couple light in the optical resonator circulating in a second direction opposite to the first direction out of the optical resonator as a first output beam; and a second optical coupler fixed in position relative to the optical resonator and evanescently coupled to the optical resonator to couple the second modulated laser beam into one or more optical whispering gallery modes of the optical resonator circulating in the optical resonator in the second direction and to couple light in the optical resonator circulating in the first direction out of the optical resonator as the second output beam.

In addition, a first optical detector is provided to receive the second output beam to produce a first detector signal. A second optical detector is provided to receive the first output beam to produce a second detector signal. A first signal mixer mixes the first detector signal with a signal at the first modulation frequency to produce a gyro output indicating a rotation of the optical resonator. A second signal mixer mixes the second detector signal with a signal at the second modulation frequency to produce a laser control signal. A laser lock circuit that applied the laser control signal to the first laser to stabilize the first laser.

This design include two phase-locked and frequency-offset lasers that are simultaneously locked to two different WGM's of the same resonator.

Two separate lasers are phase locked to each other using an optical phase lock loop. The laser emissions are coincident on a fast photodiode. The output of the photodiode is mixed with an RF signal that corresponds in frequency to the WGMR FSR. The mixed signal is fed back to the second laser. The two lasers are phase locked and frequency locked at 1 FSR separation. Frequency drifts of laser 2 are corrected by the frequency lock servo.

The emission of laser 1 is modulated at a frequency f1, then coupled to the CW resonator mode. On the transmission side, the laser light is collected on a photodiode. A Pound-Drever-Hall lock locks the emission wavelength of laser-1 to the mode frequency of the CW mode. The emission of laser 2 is modulated at a frequency f2, then collected on a photodiode in transmission through the resonator. The photodiode output is demodulated by mixing it with f2. The resultant output is fed back to the modulator on the CCW arm, and also serves as the gyro output.

The resultant gyro architecture is insensitive to resonator temperature, and (over signal integration time) is insensitive to temperature fluctuations of either laser.

In some implementations, the second laser need not be frequency locked 1 FSR away from the first laser. This optional feature is there to avoid setting up an intensity grating within the resonator caused by two counter propagating frequency coincident modes. Frequencies f1 and f2 may be the same if appropriate shielding is in place. The motivation for making them different is to be able to filter out crosstalk noises using appropriately selected electronic bandpass filters in either arm of the locking circuitry.

Figure 12:
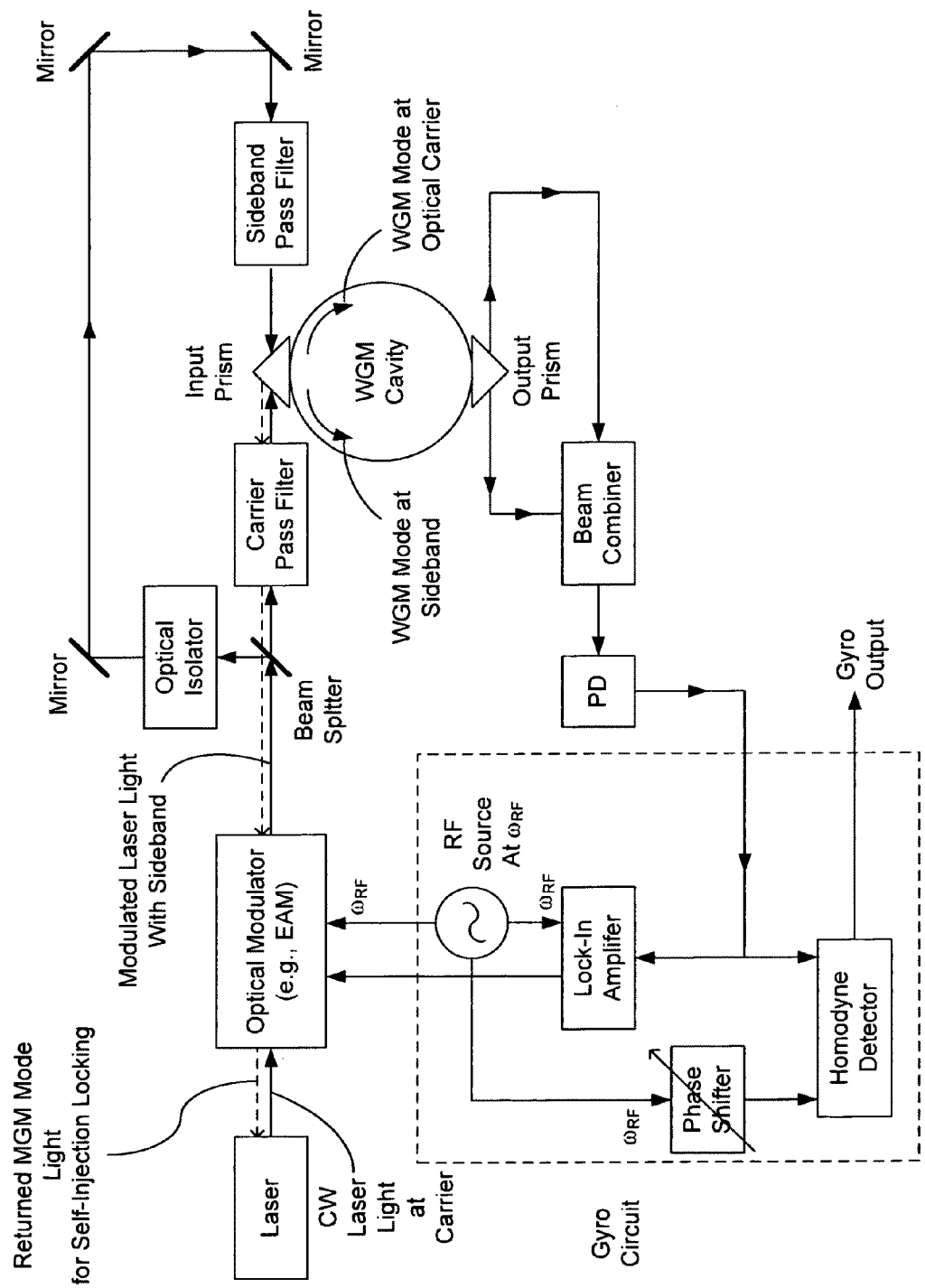
FIG. 12 illustrates an example of an optical gyroscope by using a single source laser, a single optical modulator and the rotation of the optical WGM resonator to produce a phase shift in the light coupled in one or more WGM modes inside the WGM resonator based on multiple look loops for stabilizing the two counter propagating light beams in WGM modes in the WGM resonator.

FIG. 12 shows a design that uses one laser and one modulator. This design includes a laser that produces laser light at a laser carrier frequency; an optical modulator in a path of the laser light to modulate the laser light to produce a modulated laser beam; an optical set up that splits the modulated laser beam into a first laser beam and a second laser beam in opposition directions; an optical resonator fixed in position relative to the laser and made of an optical material and structured to support optical whispering gallery modes that propagate in opposite directions in a closed optical loop in the optical resonator; a first optical filter in a path of the first beam to transmit light at the laser carrier frequency while rejecting other light to produce the first filtered laser beam; a second optical filter in a path of the second beam to transmit light at a modulation sideband while rejecting other light including light at the laser carrier frequency to produce the second filtered laser beam; an input optical coupler fixed in position relative to the optical resonator and evanescently coupled to the optical resonator to couple the first filtered laser beam into one or more optical whispering gallery modes of the optical resonator circulating in the optical resonator in a first direction and to couple second filtered laser beam into the optical resonator circulating in a second direction opposite to the first direction; an output optical coupler fixed in position relative to the optical resonator and evanescently coupled to the optical resonator to couple the first filtered laser beam out of the optical resonator as a first output beam and to couple the second filtered laser beam out of the optical resonator as a second output beam; a beam combiner that combines the first and second output beams to produce a combined beam; an optical detector to receive the combined beam to produce a detector signal; and a gyro circuit that uses the detector signal to control the optical modulator and to produce a gyro output indicating a rotation of the optical resonator.

This is a passive WGM gyroscope where the optical WGM resonator is a passive optical resonator. The radiation from a diode laser is sent through an EAM toward a WGM resonator. The EAM is modulated at high enough frequency (w_RF) corresponding to the FSR of the WGM resonator or to the frequency splitting between any two WGMs (we are able to create a WGMR with given spectrum). In some implementations, the modulation frequency can be set higher than 10 GHz to be able to selectively suppress one of the modulation sidebands and also to suppress influence of the modulation on the self-injection locking. The modulation is made using a high quality DRO or other spectrally pure oscillator.

The modulated light is split into two parts with a beam splitter. One part is injected into one side of the evanescent field (e.g. prism) coupler and the other part—into the other side. WDM filters are used to allow either carrier or one of the sidebands to enter the resonator, so that the carrier travels one direction within the resonator and the sideband—the other Due to the residual Rayleigh scattering in the resonator 0.001 or less of the light reflects back within the resonator. This light is used for locking the laser. The back reflected light also deteriorates the signal. In the case of significant back reflection, two additional WDM filters can be used after the second coupler. On the other hand, we assume that 0.1% of back reflection is not critical.

Light at the exit of another evanescent field coupler is used for the signal retrieval. The outputs are merged and sent to a fast photodiode. The photocurrent is modulated at the RF frequency and its phase is shifted with respect to the phase of the RF fed into the EAM. The value of the phase shift is twice of the optical Sagnac phase shift. The thermal shift is suppressed due to the symmetry of the system (the residual thermal shift of the RF phase is w_RF/w_opt times less than the optical thermal shift).

The RF signal is amplified when needed and analyzed using a homodyne detector. The RF oscillator used to pump the EAM is also used as an RF LO. The LO has a phase rotator to select right phase to be able to measure the Sagnac phase shift. As the result we measure the phase including its sign, to be able to find the direction of the rotation.

Figure 13:
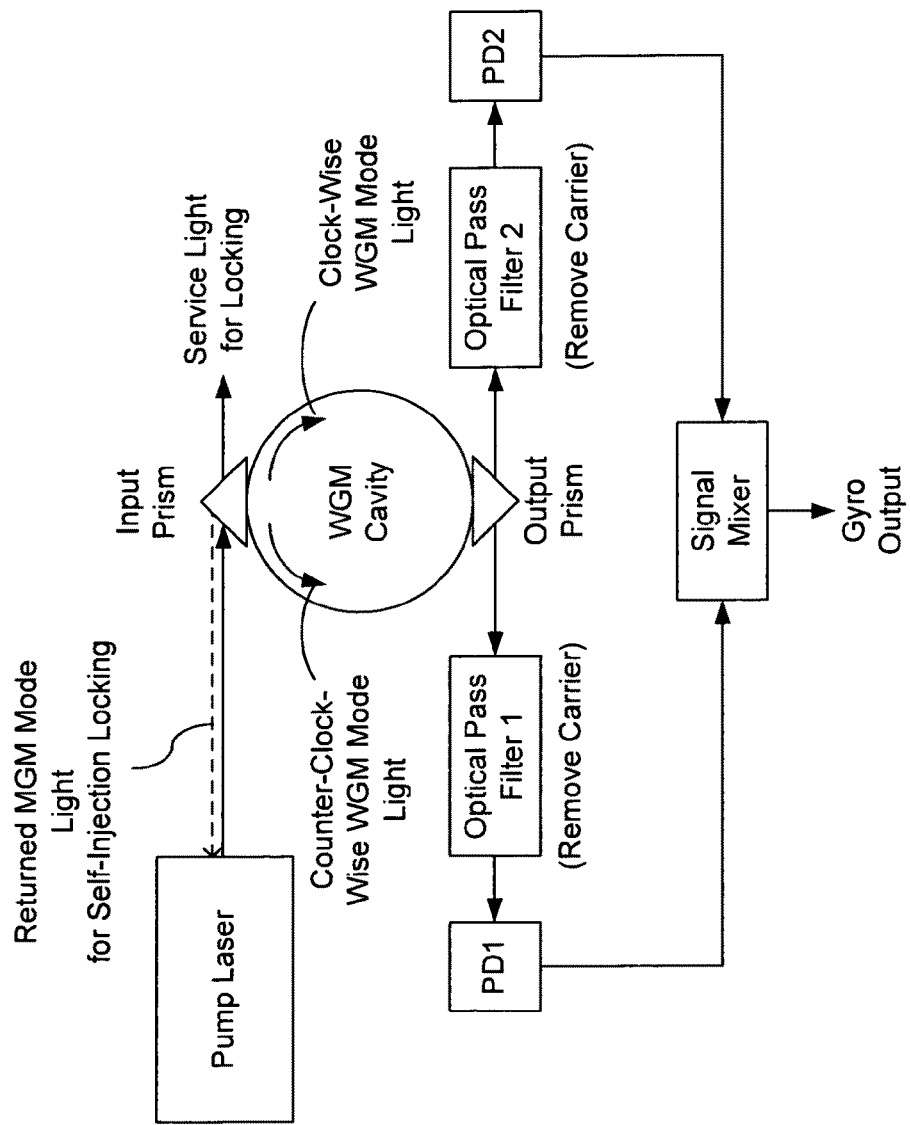
FIG. 13 illustrates an example of an optical gyroscope by using a single source laser, frequency comb generation inside the WGM resonator, and the rotation of the optical WGM resonator to produce a phase shift in the light coupled in one or more WGM modes inside the WGM resonator.
Figure 14:
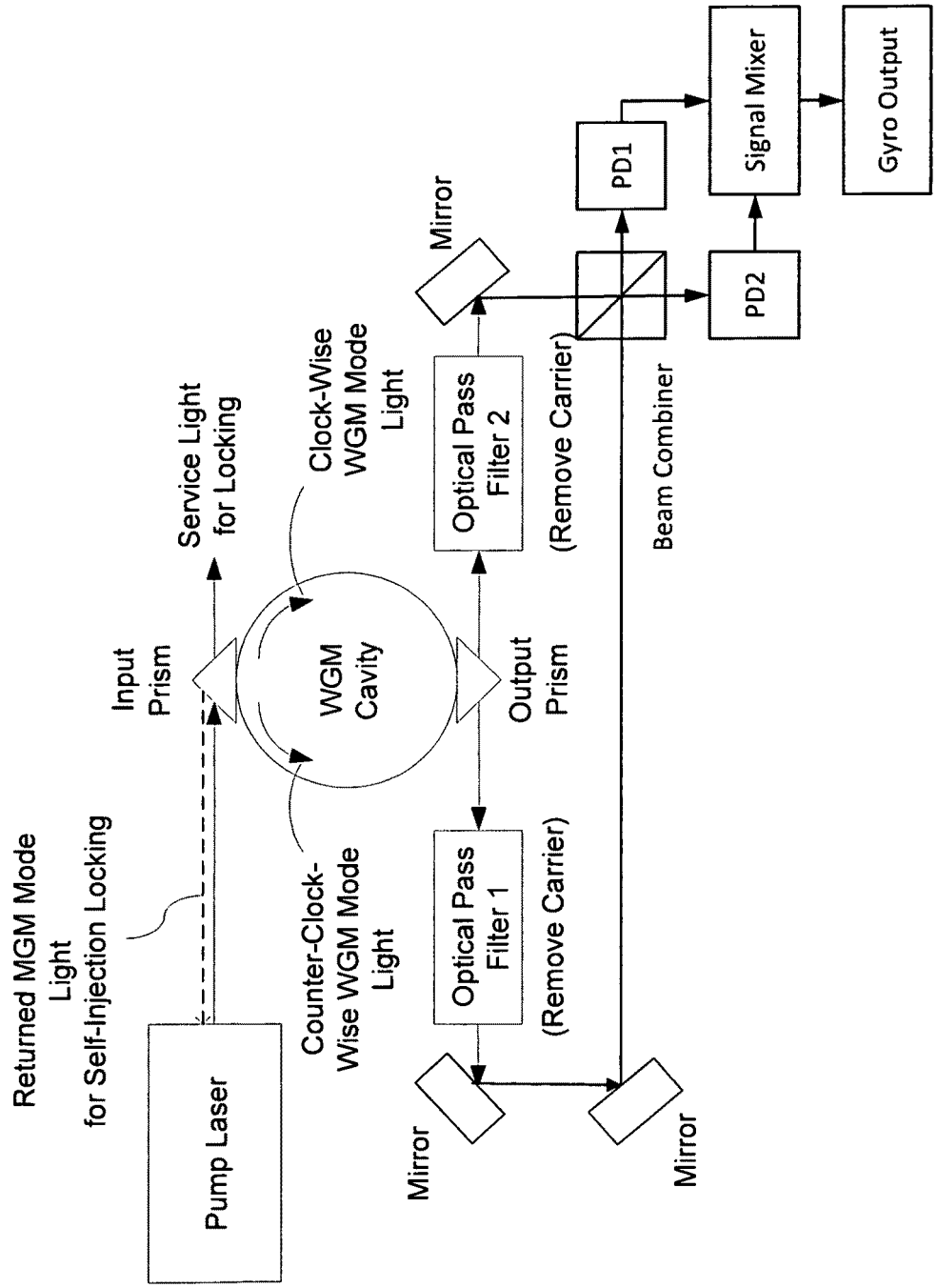
FIG. 14 illustrates an example of an optical gyroscope by using a single source laser, Stimulated Raman Scattering inside the WGM resonator, and the rotation of the optical WGM resonator to produce a phase shift in the light coupled in one or more WGM modes inside the WGM resonator.

In the above examples, the WGM resonators are passive. Alternatively, the nonlinear optical effects in WGM resonators can be used to produce frequency bands that would eliminate the need for external optical modulation outside the WGM resonators. FIG. 13 and FIG. 14 illustrate two examples.

The Raman laser generates light in two opposite directions in the resonator. If the resonator is rotated the frequency of the light generated in the opposite directions changes. Detecting the frequency shift one is able to detect the rotation speed. The gyro can be very compact and extremely sensitive for its size. If the size of the device is not critical, 0.5-2 inch diameter CaF2 WGM resonator can be integrated with a DFB pump laser that will give frequency output similar to He—Ne etc ring laser gyros. Such designs can be implemented to achieve one or more the following benefits 1) miniature size and small weight, 2) narrow linewidth rivaling that of large gas lasers and 3) much improved acoustic/vibration tolerance, and other sources of perturbation. To realize the RF signal generation, demodulating the comb can be achieved on a fast photodiode. The output of the photodiode generates RF signal of interest. Because the Raman laser is mode locked, it generates optical pulses. The optical pulses should have outstanding timing jitter characteristics.

FIG. 13, the optical gyroscope device includes a laser that produces laser light at a laser carrier frequency; an optical resonator fixed in position relative to the laser and made of an optical material and structured to support optical whispering gallery modes that propagate in opposite directions in a closed optical loop in the optical resonator; an input optical coupler fixed in position relative to the optical resonator and evanescently coupled to the optical resonator to couple the laser light into one or more optical whispering gallery modes of the optical resonator circulating in the optical resonator in a first direction and in a second direction opposite to the first direction, the input optical resonator further configured to couple light out of the optical resonator as an injection beam back to the laser to lock the laser; and an output optical coupler fixed in position relative to the optical resonator and evanescently coupled to the optical resonator to couple light in the first direction out of the optical resonator as a first output beam and to couple light in the second direction out of the optical resonator as a second output beam. The optical resonator is configured to produce a frequency comb at different frequencies in light circulating inside the optical resonator.

Additionally, the device in FIG. 13 includes a first optical filter to filter the first output beam to remove light at the laser carrier frequency to produce a first filtered beam; a second optical filter to filter the second t output beam to remove light at the laser carrier frequency to produce a second filtered beam; a first detector that converts the first filtered beam into a first detector signal; a second detector that converts the second filtered beam into a second detector signal; and a mixer that mixes the first and second detector signals to produce a gyro output indicating a rotation of the optical resonator.

FIG. 14 shows another design where the optical resonator produces Raman bands. This device includes a laser that produces laser light at a laser carrier frequency and an optical resonator fixed in position relative to the laser and made of an optical material and structured to support optical whispering gallery modes that propagate in opposite directions in a closed optical loop in the optical resonator. The optical resonator is structured to produce Raman frequency bands via stimulated Raman scattering.

An input optical coupler is fixed in position relative to the optical resonator and evanescently coupled to the optical resonator to couple the laser light into one or more optical whispering gallery modes of the optical resonator circulating in the optical resonator in a first direction and in a second direction opposite to the first direction, the input optical resonator further configured to couple light out of the optical resonator as an injection beam back to the laser to lock the laser. An output optical coupler is fixed in position relative to the optical resonator and evanescently coupled to the optical resonator to couple light in the first direction out of the optical resonator as a first output beam and to couple light in the second direction out of the optical resonator as a second output beam.

This device also includes a first optical filter to filter the first output beam to remove light at the laser carrier frequency to produce a first filtered beam; a second optical filter to filter the second t output beam to remove light at the laser carrier frequency to produce a second filtered beam; a beam combiner that combines the first and second filtered beams to produce a first output beam and a second output beam; a first detector that converts the first output beam into a first detector signal; a second detector that converts the second output beam into a second detector signal; and a mixer that mixes the first and second detector signals to produce a gyro output indicating a rotation of the optical resonator.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations, modifications and enhancements of the disclosed implementations and other implementations can be made based on what is described and illustrated in this document.

What is claimed is:

1. An optical gyroscope device, comprising:
a laser that produces laser light;
an optical resonator fixed in position relative to the laser and made of an optical material and structured to support optical whispering gallery modes that propagate in opposite directions in a closed optical loop in the optical resonator;
an optical coupler fixed relative to the optical resonator and evanescently coupled to the optical resonator to couple the laser light into one or more optical whispering gallery modes of the optical resonator and to couple the laser light in a particular optical whispering gallery mode inside the optical resonator as an injection laser beam back to the laser to cause injection locking of the laser to the particular optical whispering gallery mode;
a beam splitter fixed in position in an optical path of the laser light between the laser and the optical coupler to split a portion of the laser propagating towards the optical coupler as a first laser beam and to split a portion of the injection laser beam propagating towards the laser into a second laser beam;
a beam combiner fixed in position relative to the beam splitter to receive the first and second laser beam and to spatially overlap the received first and second laser beams to produce a combined laser beam;
an optical detector that receives the combined laser beam to produce a detector output that contains phase shift information in the optical interference between the first and second laser beams indicating a rotation of the optical resonator.

2. The device as in claim 1, comprising:
an optical modulator fixed in position between the laser and the beam splitter to cause a modulation of the laser light at a modulation frequency that is further modulated at a ramp frequency;
a laser lock circuit coupled to receive the detector output and information of the modulation frequency which is modulated at the ramp frequency and to produce a laser control signal based on the detector output and the information of the modulation frequency to lock the laser in frequency.

3. The device as in claim 2, comprising:
an output circuit that receives the laser control signal from the laser lock circuit and to demodulates the laser control signal with respect to the ramp frequency to produce a gyro output signal indicating the rotation of the optical resonator.

4. The device as in claim 3, comprising:
a resonator temperature sensor placed near the optical resonator to measure a local temperature;
a resonator temperature compensation servo circuit that receives the measured local temperature from the resonator temperature sensor to provide a correction to the gyro output signal.

5. The device as in claim 3, comprising:
a laser temperature sensor to measure a temperature of the laser
a laser temperature compensation servo circuit that receives the measured laser temperature from the laser temperature sensor to provide a shift to laser modulation frequency that compensates for a change in the laser temperature.

6. The device as in claim 3, comprising:
a laser temperature sensor to measure a temperature of the laser
a laser temperature compensation servo circuit that controls the laser temperature to compensate for a change in the laser temperature.

7. An optical gyroscope device, comprising:
a laser that produces laser light at a laser carrier frequency;
an optical set up that splits the laser light into a first laser beam and a second laser beam in opposition directions;
an optical resonator fixed in position relative to the laser and made of an optical material and structured to support optical whispering gallery modes that propagate in opposite directions in a closed optical loop in the optical resonator;
a first optical modulator in a path of the first beam to modulate the first laser beam to produce a first modulated laser beam;
a second optical modulator in a path of the second beam to modulate the second laser beam to produce a second modulated laser beam;
an input optical coupler fixed in position relative to the optical resonator and evanescently coupled to the optical resonator to couple the first modulated laser beam into one or more optical whispering gallery modes of the optical resonator circulating in the optical resonator in a first direction and to couple second modulated laser beam into the optical resonator circulating in a second direction opposite to the first direction;
an output optical coupler fixed in position relative to the optical resonator and evanescently coupled to the optical resonator to couple the first modulated laser beam out of the optical resonator as a first output beam and to couple the second modulated laser beam out of the optical resonator as a second output beam;
a first optical filter to filter the first output beam to remove light at the laser carrier frequency to produce filtered first output beam;
a second optical filter to filter the second output beam to remove light at the laser carrier frequency to produce filtered second output beam;
a first optical detector to receive the filtered first output beam to produce a first detector signal;
a second optical detector to receive the filtered second output beam to produce a second detector signal;
a laser lock circuit that stabilizes the laser in frequency;
a first lock circuit that controls the first optical modulator based on the first detector signal to stabilize a frequency of the first modulated laser beam at a first whispering gallery mode of the optical resonator;
a second lock circuit that controls the second optical modulator based on the second detector signal to stabilize a frequency of the second modulated laser beam at a second whispering gallery mode of the optical resonator; and
a signal mixer that mixes outputs of the first and second lock circuits to produce a gyro output indicating a rotation of the optical resonator.

8. An optical gyroscope device, comprising:
a first laser that produces first laser light at a first laser carrier frequency;
a second laser that produces second laser light at a second laser carrier frequency;

a laser lock circuit that stabilizes the second laser relative to the first laser in frequency;
a first optical modulator that modulates the first laser beam at a first modulation frequency to produce a first modulated laser beam;
a second optical modulator that modulates the second laser beam at a second modulation frequency to produce a second modulated laser beam;
an optical resonator fixed in position relative to the first and second lasers and made of an optical material and structured to support optical whispering gallery modes that propagate in opposite directions in a closed optical loop in the optical resonator;
a first optical coupler fixed in position relative to the optical resonator and evanescently coupled to the optical resonator to couple the first modulated laser beam into one or more optical whispering gallery modes of the optical resonator circulating in the optical resonator in a first direction and to couple light in the optical resonator circulating in a second direction opposite to the first direction out of the optical resonator as a first output beam;
a second optical coupler fixed in position relative to the optical resonator and evanescently coupled to the optical resonator to couple the second modulated laser beam into one or more optical whispering gallery modes of the optical resonator circulating in the optical resonator in the second direction and to couple light in the optical resonator circulating in the first direction out of the optical resonator as the second output beam;
a first optical detector to receive the second output beam to produce a first detector signal;
a second optical detector to receive the first output beam to produce a second detector signal;
a first signal mixer that mixes the first detector signal with a signal at the first modulation frequency to produce a gyro output indicating a rotation of the optical resonator;
a second signal mixer that mixes the second detector signal with a signal at the second modulation frequency to produce a laser control signal; and
a laser lock circuit that applied the laser control signal to the first laser to stabilize the first laser.

9. An optical gyroscope device, comprising:
a laser that produces laser light at a laser carrier frequency;
an optical modulator in a path of the laser light to modulate the laser light to produce a modulated laser beam;
an optical set up that splits the modulated laser beam into a first laser beam and a second laser beam in opposition directions;
an optical resonator fixed in position relative to the laser and made of an optical material and structured to support optical whispering gallery modes that propagate in opposite directions in a closed optical loop in the optical resonator;
a first optical filter in a path of the first beam to transmit light at the laser carrier frequency while rejecting other light to produce the first filtered laser beam;
a second optical filter in a path of the second beam to transmit light at a modulation sideband while rejecting other light including light at the laser carrier frequency to produce the second filtered laser beam;
an input optical coupler fixed in position relative to the optical resonator and evanescently coupled to the optical resonator to couple the first filtered laser beam into one or more optical whispering gallery modes of the optical resonator circulating in the optical resonator in a first direction and to couple second filtered laser beam into the optical resonator circulating in a second direction opposite to the first direction;
an output optical coupler fixed in position relative to the optical resonator and evanescently coupled to the optical resonator to couple the first filtered laser beam out of the optical resonator as a first output beam and to couple the second filtered laser beam out of the optical resonator as a second output beam;
a beam combiner that combines the first and second output beams to produce a combined beam;
an optical detector to receive the combined beam to produce a detector signal; and
a gyro circuit that uses the detector signal to control the optical modulator and to produce a gyro output indicating a rotation of the optical resonator.

10. An optical gyroscope device, comprising:
a laser that produces laser light at a laser carrier frequency;
an optical resonator fixed in position relative to the laser and made of an optical material and structured to support optical whispering gallery modes that propagate in opposite directions in a closed optical loop in the optical resonator;
an input optical coupler fixed in position relative to the optical resonator and evanescently coupled to the optical resonator to couple the laser light into one or more optical whispering gallery modes of the optical resonator circulating in the optical resonator in a first direction and in a second direction opposite to the first direction, the input optical resonator further configured to couple light out of the optical resonator as an injection beam back to the laser to lock the laser;
an output optical coupler fixed in position relative to the optical resonator and evanescently coupled to the optical resonator to couple light in the first direction out of the optical resonator as a first output beam and to couple light in the second direction out of the optical resonator as a second output beam;
a first optical filter to filter the first output beam to remove light at the laser carrier frequency to produce a first filtered beam;
a second optical filter to filter the second t output beam to remove light at the laser carrier frequency to produce a second filtered beam;
a first detector that converts the first filtered beam into a first detector signal;
a second detector that converts the second filtered beam into a second detector signal; and
a mixer that mixes the first and second detector signals to produce a gyro output indicating a rotation of the optical resonator,
wherein the optical resonator is configured to produce a frequency comb at different frequencies in light circulating inside the optical resonator.

11. An optical gyroscope device, comprising:
a laser that produces laser light at a laser carrier frequency;
an optical resonator fixed in position relative to the laser and made of an optical material and structured to support optical whispering gallery modes that propagate in opposite directions in a closed optical loop in the optical resonator, the optical resonator structured to produce Raman frequency bands via stimulated Raman scattering;
an input optical coupler fixed in position relative to the optical resonator and evanescently coupled to the optical resonator to couple the laser light into one or more optical whispering gallery modes of the optical resonator circulating in the optical resonator in a first direction and in a second direction opposite to the first direction, the input optical resonator further configured to couple light out of the optical resonator as an injection beam back to the laser to lock the laser;

an output optical coupler fixed in position relative to the optical resonator and evanescently coupled to the optical resonator to couple light in the first direction out of the optical resonator as a first output beam and to couple light in the second direction out of the optical resonator as a second output beam;

a first optical filter to filter the first output beam to remove light at the laser carrier frequency to produce a first filtered beam;

a second optical filter to filter the second t output beam to remove light at the laser carrier frequency to produce a second filtered beam;

a beam combiner that combines the first and second filtered beams to produce a first output beam and a second output beam;

a first detector that converts the first output beam into a first detector signal;

a second detector that converts the second output beam into a second detector signal; and a mixer that mixes the first and second detector signals to produce a gyro output indicating a rotation of the optical resonator.

* * * * *